United States Patent Office 2,801,995
Patented Aug. 6, 1957

2,801,995

BLUE SULFUR DYESTUFFS AND PROCESSES FOR MANUFACTURING THEM

George Clifford Strouse, East Aurora, N. Y., assignor to Allied Chemical & Dye Corporation, New York, N. Y., a corporation of New York No Drawing. Application June 30, 1953, Serial No. 365,277

12 Claims. (Cl. 260—134)

This invention relates to blue sulfur dyestuffs and processes for their manufacture. It relates more particularly to improvements in dyestuffs of the sulfurized 2,4-dinitro-4'-hydroxydiphenylamine class, which dye cotton and other cellulosic fibers blue shades from an aqueous sodium sulfide bath, and to processes for the manufacture thereof.

An object of the present invention is to provide blue dyestuffs of the sulfurized 2,4-dinitro-4'-hydroxydiphenylamine class having improved properties with respect to the quality of the dyeings obtained therewith and especially brightness of shade.

Further objects of the present invention are to provide leuco derivatives of blue dyestuffs of the sulfurized 2,4-dinitro-4'-hydroxydiphenylamine class which give dyeings on cotton and other cellulosic fibers from aqueous sodium sulfide baths which, upon oxidation, become bright blue; and to provide improvements in direct dyes of the sulfurized 2,4-dinitro-4'-hydroxydiphenylamine class, whereby blue dyeings of improved quality and especially brightness of shade can be obtained directly on cotton and other cellulosic fibers from an aqueous sodium sulfide bath.

Additional objects of the present invention are to provide improvements in the process of manufacturing blue dyestuffs of the sulfurized 2,4-dinitro-4'-hydroxydiphenylamine class whereby blue dyeings of improved quality and especially brightness of shade on cotton and other cellulosic fibers can be obtained; to provide processes for the manufacture of leuco derivatives of blue dyestuffs of the sulfurized 2,4-dinitro-4'-hydroxydiphenylamine class which give dyeings on cotton and other cellulosic fibers from aqueous sodium sulfide baths which, upon oxidation, become bright blue; and to provide improvements in the process of manufacturing sulfur dyestuffs of the sulfurized 2,4-dinitro-4'-hydroxydiphenylamine class whereby dyestuffs are obtained which produce blue dyeings of improved quality and especially brightness of shade directly on cotton and other cellulosic fibers from an aqueous sodium sulfide bath.

Dyestuffs of the sulfurized 2,4-dinitro-4'-hydroxydiphenylamine class are well known. For example, the prototype of this class is represented by Color Index No. 956. They are ordinarily manufactured by heating 2,4-dinitro-4'-hydroxydiphenylamine with a sulfurization agent, e. g., an alkali metal polysulfide (usually sodium polysulfide), in the presence or absence of water or a suitable organic solvent, e. g., a lower alcohol (usually ethanol). After completion of the sulfurization (thionation), the dyestuff is recovered and separated from unreacted polysulfides, sulfur reduction products and other by-products of the reaction; for example, by oxidation, usually by aeration, followed by salting out of the dyestuff, or by acidification of the sulfurization reaction mass and purification of the resulting dyestuff with or without an oxidation treatment. (See, for example, U. S. P. 1,867,202.)

The dyestuffs of this class as thus produced are direct dyestuffs for cotton and other cellulosic fibers; they dye such fibers blue shades from aqueous alkali metal sulfide baths which shades are not altered by an additional oxidation treatment.

It is known that the shade of blue produced by the dyestuffs of this class can be modified, either in the direction of increased redness or increased greenness of blue shade, by varying the degree of oxidation to which the sulfurized product is subjected. It is also known to vary the redness or greenness of blue shade of said dyeings by substituting an indophenol or leuco indophenol for a minor portion (e. g., up to about 20% by weight) of the 2,4-dinitro-4'-hydroxydiphenylamine employed as starting material. Thus, the substitution of minor amounts of 4-dimethylamino-4'-hydroxydiphenylamine or 4-phenylamino-4'-hydroxydiphenylamine for a minor portion of the 2,4-dinitro-4'-hydroxydiphenylamine results in dyestuffs giving more greenish blue shades; and the substitution of quinonemono(4-amino-3-methylanil) for a minor portion of the 2,4-dinitro-4'-hydroxydiphenylamine results in dyestuffs giving more reddish blue shades. Accordingly, the term "dyestuffs of the sulfurized 2,4-dinitro-4'-hydroxydiphenylamine class" as employed herein and in the claims denotes products obtained by sulfurizing mixtures of the latter type as well as products obtained by sulfurizing 2,4-dinitro-4'-hydroxydiphenylamine alone.

Although the dyestuffs of the sulfurized 2,4-dinitro-4'-hydroxydiphenylamine class possess moderately good fastness properties and are relatively cheap to manufacture, they have not found utilization commensurate with their low cost owing to certain disadvantageous properties and especially lack of brightness of their dyeings, particularly on cotton. It has heretofore been proposed to overcome this difficulty by subjecting the dyed fiber to an oxidative aftertreatment with sodium perborate. Aside from the disadvantage of the additional step in the dyeing process which this treatment requires, the added cost reduces the advantage of the cheapness of the dyestuff.

According to the present invention, improved sulfur dyestuffs of the sulfurized 2,4-dinitro-4'-hydroxydiphenylamine class are produced by treating a sulfurized dyestuff of said class with a cyanide of an alkali-forming metal (that is, an alkali metal cyanide or an alkaline-earth metal cyanide) in an alkaline medium (that is, a medium having a pH greater than 7), and preferably in a strongly alkaline aqueous medium (that is, having a pH greater than 10), and oxidizing the dyestuff during at least one stage of the overall process (that is, during manufacture of the dyestuff, or prior to, during, or after the cyanide treatment of the dyestuff).

I have discovered that blue dyestuffs of the sulfurized 2,4-dinitro-4'-hydroxydiphenylamine class having improved properties with respect to the quality of the dyeings obtained therewith and especially increased brightness of shade, as compared with the known sulfurized dyestuffs (such as, the dyestuff of U. S. P. 1,867,202) can be obtained by subjecting a dyestuff of the sulfurized 2,4-dinitro-4'-hydroxydiphenylamine class to treatment with an alkali metal cyanide, or with an alkaline-earth metal cyanide, in an alkaline reaction medium and subjecting the dyestuff to oxidation during at least one stage of the overall process. I have discovered, furthermore, that by varying the conditions and duration of the cyanide treatment the resulting dyestuffs can be obtained in the form of direct dyes (that is, dyes which produce bright blue shades on cotton and other cellulosic fibers directly from the usual aqueous sodium sulfide baths which shades are not substantially altered when exposed to the air), or in the form of leuco dyeing derivatives of said dyes, that is, dyestuffs which dye cotton and other cellulosic fibers from the usual aqueous sodium sulfide baths olive shades that become bright blue upon exposure to the air or upon other oxidation treatment.

In carrying out the cyanide treatment in accordance with the present invention, the dyestuff resulting from the sulfurization of 2,4-dinitro-4'-hydroxydiphenylamine or a mixture of the latter with a minor amount of an indophenol or leuco indophenol is mixed (for example, by stirring) with an alkali metal cyanide (for example, sodium or potassium cyanide) or an alkaline-earth metal cyanide (for example, calcium cyanide) in a medium which is on the alkaline side of neutrality and which is preferably alkaline to Clayton Yellow. If the dyestuff has not been oxidized after its formation by the sulfurization process, it is subjected to oxidation prior to the cyanide treatment or during the course of the cyanide treatment or after completion of the cyanide treatment. Any of the usual oxidizing agents may be employed, such as air, hydrogen peroxide, etc. I have found that the cyanide treatment of a sulfurized 2,4-dinitro-4'-hydroxydiphenylamine dyestuff which has not been subjected to oxidation (for example, a dyestuff which has been recovered from the thionation reaction mass by acidification of the reaction mass and purification of the resulting precipitated dyestuff without oxidation) and which has not been subsequently oxidized during or following the cyanide treatment, gives dyeings on cotton from an aqueous sodium sulfide dyebath which do not have sufficient increased brightness of shade to warrant carrying out the treatment.

Following the cyanide treatment, the dyestuff may be recovered from the reaction mixture in any suitable manner, as by salting out with common salt, followed by filtration of the precipitated dyestuff.

The extent to which increased brightness of the dyeings is obtained in accordance with the present invention varies with the various reagents and conditions of the cyanide treatment, such as the nature and amount of cyanide employed, the temperature and duration of the cyanide treatment, and the purity of the dyestuff subjected to the treatment. By suitable selection of these factors, the precise result can be adjusted to meet desired standards.

While the various alkali metal and alkaline-earth metal cyanides may be employed, I prefer to use alkali metal cyanides, especially sodium cyanide, since they are inexpensive and do not form difficultly soluble salts with polysulfides, thiosulfate, and other sulfur compounds which may be present as impurities in the dyestuffs subjected to the process. When alkaline-earth metal cyanides are used, products of satisfactory solubility may be obtained by first removing such impurities from the initial dyestuffs in the known manner. This result is surprising, especially in view of the large amounts of alkaline-earth metal cyanide which can be used in practicing the process, since many purified sulfur dyes are rendered insoluble by relatively small concentrations of calcium or other alkaline-earth metal ions.

The amounts of cyanide employed may vary widely, and the exact amount required to effect the desired brightening may be readily determined by routine test of a particular sulfurized dyestuff employed as starting material. Ordinarily, a sufficient amount is employed to effect a substantial brightening of the dyeings. In general, an amount of cyanide is employed corresponding with 5% to 100% of the weight of 2,4-dinitro-4'-hydroxydiphenylamine required to produce the particular amount of sulfurized dyestuff treated. (Since the dye strength of the sulfurized dyestuffs varies from batch to batch of dyestuff, the proportions are set out in terms of the amount of 2,4-dinitro-4'-hydroxydiphenylamine required to produce a given amount of dyestuff.) The brightening effect generally increases with an increase in the amount of cyanide employed, other conditions being the same. The invention is not limited to the stated proportions, however, since even smaller amounts than 5% are effective in some degree, especially when the sulfurized 2,4-dinitro-4'-hydroxydiphenylamine is in relatively pure form.

Polysulfides, thiosulfates and free sulfur, which may be present as impurities in the dyes subjected to the cyanide treatment, react with cyanides under the treatment conditions to form triocyanates, which I have found do not produce a brightening of the dyestuffs. Therefore it is preferable to remove such impurities prior to treating the dyestuff with the cyanide, although sulfurized products containing such impurities, particularly in minor amounts, may be subjected to the process of the present invention provided an excess of cyanide over that so consumed by such impurities is employed.

The temperature of the cyanide treatment also may be varied. Thus, satisfactory results can be obtained by carrying out the treatment at ordinary room temperatures or at more elevated temperatures. In general, direct dyes are obtained by effecting the cyanide treatment at temperatures below 70° C. or with amounts of cyanide corresponding to less than 50% of the weight of the 2,4-dinitro-4'-hydroxydiphenylamine sulfurized; whereas leuco dyeing compounds are obtained at higher temperatures or with larger proportions of cyanide. The line of demarcation between conditions producing direct dyes and those yielding leuco dyeing compounds is not exact, and products containing mixtures of various proportions of direct and leuco dyeing colors can be obtained over a considerable range of temperatures and proportions.

In the preferred practice of the present invention, the cyanide treatment is performed in an aqueous alkaline medium (preferably an aqueous sodium hydroxide medium) in the presence of a reducing agent which reduces the dyestuff to a soluble leuco form (such as an alkali metal hydrosulfite, preferably sodium hydrosulfite).

For ease of operation, the process of the present invention is preferably carried out as an adjunct to the manufacture of the dyestuff by sulfurization of a 2,4-dinitro-4'-hydroxydiphenylamine starting material (alone or in conjunction with a minor amount of shading material). Thus, in the preferred practice of the process, the sulfurized product, recovered in the form of a filter-cake from the thionation process, is slurried with an aqueous alkali and the resulting slurry is subjected to the cyanide treatment.

Preferably, the sulfurized dyestuff is separated in known manner from the sulfurization mass, excess sulfurizing agent, etc. prior to the cyanide treatment. For example, sodium hydroxide may be mixed with the sulfurization mass, if necessary, to convert free sulfur to soluble sulfides, and the mass may be salted with common salt or acidified, to precipitate the dyestuff, and the purified dyestuff may then be isolated by filtration and washed. Preferably, the thionation mass is aerated in an aqueous sodium hydroxide medium until polysulfides present are converted to soluble thiosulfate and the dyestuff is precipitated, and the dyestuff is then filtered off and washed free from thiosulfate.

The invention will be illustrated by the following specific examples, but it is to be understood that it is not limited to the details thereof and that changes may be made without departing from the scope of the invention. The temperatures are in degrees centigrade and the parts and percentages are by weight, unless designated as parts by volume. Where parts are by volume, the amount signifies the volume occupied by the same number of parts by weight of water at 4° C.

*Example 1*

Part A.—A mixture of 338 parts of soft water, 435 parts of 50% aqueous sodium hydroxide and 348 parts of ground sulfur was agitated and refluxed for 20 minutes to form a polysulfide in a cast-iron pot heated by a glycerine-water bath and provided with a thermometer, glass reflux condenser and impeller agitator. Then the following were added slowly in the named order to the polysulfide solution at the boil: 300 parts of soft water, 0.5 part of a sulfonated mineral oil (Twitchell 7231 oil) as foam inhibitor, 5 parts of indophenol (obtained by reacting diphenylamine with nitrosophenol), and 95 parts of 2,4-dinitro-4'-hydroxydiphenylamine. The resulting thionation reaction mixture was refluxed at the boil (temperature of about 105°) for 16 hours. The thionation mass was transferred to an iron aeration vessel, where it was diluted with soft water to 4000 parts by volume, mixed with 300 parts of 50% aqueous sodium hydroxide, and aerated. The precipitated dye was isolated by filtration.

Part B.—The filter cake obtained by part A was slurried in 4000 parts of soft water. To the slurry 200 parts of 50% aqueous sodium hydroxide, 30 parts of sodium hydrosulfite and 10 parts of sodium cyanide were added in the named order, and the mixture was aerated (by passing a stream of air through the mixture) at room temperature for 20 hours. 1000 parts of lime free salt were added to precipitate the dye, which was filtered off, dried and ground.

The product thus obtained was a dark blue powder which dyed cotton and other cellulosic fibers from a conventional sodium sulfide dyebath bright blue shades which on exposure to air remained bright blue.

Part C.—The process of part B was repeated but without the use of sodium cyanide. The dyeings on cotton produced by the resulting direct sulfur dyestuff were a much duller blue, although the dyeings were bluer in shade and slightly less dull than those obtained with the dyestuff of part A.

Example 2

To a slurry of 75 parts of a filter cake obtained essentially as described in Example 1, part A (containing an amount of dyestuff equivalent to 10 parts of 2,4-dinitro-4'-hydroxydiphenylamine starting material) in 400 parts of soft water, were added 20 parts of 50% aqueous sodium hydroxide, 3 parts of sodium hydrosulfite and 5 parts of calcium cyanide ($Ca(CN)_2$). The resulting mixture was aerated for 20 hours at about room temperature. At the end of this period very little color was still in solution. The precipitated dye was separated by filtration, dried and ground.

The product thus obtained dyed cotton directly from an aqueous sodium sulfide dyebath bright blue shades similarly to the dyestuff of Example 1, part B. When the process of this example was repeated, but without the calcium cyanide, the resulting dyeings on cotton were a much duller blue.

Example 3

To 530 parts of a thionation mass obtained from 40 parts of 2,4-dinitro-4'-hydroxydiphenylamine in a manner essentially the same as that described in Example 1, part A, 40 parts of 50% aqueous sodium hydroxide were added and the mixture was heated to 95° to 100° (about 15 minutes). Then 100 parts of lime-free sodium chloride and 80 parts of ammonium sulfate were added, causing the dyestuff to precipitate. The dyestuff was filtered off at 50°, and the filter cake was washed with 1100 parts of 15% aqueous sodium chloride solution until free from polysulfide.

The washed filter cake was slurried in soft water and diluted to a volume of about 1600 parts. To the resulting slurry were added 40 parts of solid potassium hydroxide, 12 parts of sodium hydrosulfite and 26.5 parts of potassium cyanide. The resulting mixture was aerated at room temperature for 18 to 19 hours and then 250 parts of lime-free salt were added to completely precipitate the dyestuff, which was filtered off, dried and ground. The product thus obtained was a leuco dyeing derivative or form of a sulfur dyestuff of the type formed in Example 1, part B. It dyed cotton from an aqueous sodium sulfide dyebath olive shades which rapidly oxidized on exposure to air to yield blue dyeings of similar brightness to those obtained with the dyestuff of Example 1, part B.

When the cyanide treatment was omitted, or when the cyanide treatment was included but the aeration (oxidation) was omitted, the resulting dyestuffs were not leuco dyeing compounds but direct dyestuffs which dyed cotton dull blue shades from aqueous sodium sulfide dyebaths.

Example 4

A leuco dyeing compound identical with that of Example 3 was obtained by employing sodium cyanide and sodium hydroxide in place of the potassium cyanide and potassium hydroxide used in Example 3.

Example 5

A mixture of 150 parts of water, 130.5 parts of 50% aqueous sodium hydroxide and 122 parts of ground sulfur was charged to a fusion vessel of the type used in Example 1 and heated to form a polysulfide solution. To the polysulfide solution thus obtained, 0.1 part of the sulfonated mineral oil employed in Example 1 and 0.05 part of sulfonated castor oil were charged (to inhibit foaming) and 30 parts of 2,4-dinitro-4'-hydroxydiphenylamine were added during a half hour while holding the temperature at about 90°, and the resulting mixture was refluxed at the boil (about 105°) until a negative test for the diphenylamine starting material was obtained (about 16 hours). Then 22.5 parts of 50% aqueous sodium hydroxide and 50 parts of sodium chloride were added, and the mixture was refluxed at the boil (about 110°) for a half-hour and then filtered at about 90°. The filter cake was washed free from polysulfides with 570 parts of 15% aqueous sodium chloride solution. The washed filter cake was slurried with 1200 parts of water, and the slurry was aerated for two and a half hours (to destroy sulfides). To the resulting slurry, 10 parts of sodium cyanide and 60 parts of 50% aqueous sodium hydroxide were added and the mixture was aerated for about 20 hours at room temperature. (At the end of 17 hours the mixture was no longer alkaline to Brilliant Yellow, so 15 parts of 50% aqueous sodium hydroxide were added to restore such alkalinity.) Lime-free common salt (180 parts) was added to precipitate the dyestuff, which was filtered off, dried and ground. The product thus obtained dyed cotton directly a bright blue shade from a sodium sulfide dyebath.

When the process of this example was repeated but the sodium cyanide was omitted, the product dyed cotton directly a much duller blue shade.

Example 6

To a sodium polysulfide solution at a temperature of 100° to 105° and prepared by heating 147 parts of 49% aqueous sodium hydroxide and 125 parts of ground sulfur at 100° to 105° for about an hour, 100 parts of sodium carbonate and 30 parts of 2,4-dinitro-4'-hydroxydiphenylamine were added with agitation. The agitated mixture thus obtained was boiled under a reflux condenser at ordinary atmospheric pressure until a negative test for 2,4-dinitro-4'-hydroxydiphenylamine was obtained (about two and a half hours), the temperature rising to 125°. The reaction mixture was diluted with water to 1000 parts by volume, 50 parts of sodium carbonate were mixed in, and the mixture was aerated at 80° to 90° until dye was completely precipitated. The precipitate was separated by filtration, and the filter cake was washed, first with 1000 parts of water and then with 550 parts of 15% aqueous sodium chloride.

The filter cake was slurried with 500 parts of water, 16 parts of sodium cyanide were added and the mixture was boiled under reflux for about 12 hours, during which time partial solution of the dyestuff occurred. Then 120 parts of sodium chloride were added to precipitate the dyestuff, which was then filtered off, washed with 440 parts of 15% aqueous sodium chloride, dried and ground.

The product thus obtained was a leuco dyeing derivative or form of a sulfur dyestuff. When dyed on cotton from a sodium sulfide dyebath, it gave olive shades which became bright blue on exposure to air.

When the process of this example was repeated but the sodium cyanide treatment was omitted, the product obtained was a direct dye which yielded a much duller blue shade on cotton.

*Example 7*

The process of Example 6 was repeated with the following variations in the cyanide treatment. The slurry was subjected to an oxidation treatment with 20 to 30 parts of 30% hydrogen peroxide at about 25° for 2 to 4 hours just before the cyanide treatment or after the cyanide treatment. The amount of sodium cyanide was decreased to 8 parts and increased to 32 parts. In all cases, a leuco dyeing derivative or form of a sulfur dyestuff similar to that produced in Example 6 was obtained, which gave similar bright blue oxidized dyeings on cotton.

It will be evident to those skilled in the art that the invention is not limited to the details of the foregoing illustrative examples and that changes can be made without departing from the scope of the invention. Accordingly, it will be understood that the description should be interpreted as illustrative and not in a limiting sense.

I claim:

1. In the process of manufacturing sulfur dyestuffs of the sulfurized 2,4-dinitro-4'-hydroxydiphenylamine class by reacting 2,4-dinitro-4'-hydroxydiphenylamine with a sulfurizing agent, the improvement which comprises treating the resulting dyestuff with a cyanide of an alkali-forming metal in an alkaline reaction medium, and oxidizing the dyestuff during at least one stage of the overall process, whereby dyestuffs dyeing cotton brighter shades of blue than the untreated dyestuff are produced.

2. The improved process defined in claim 1 wherein the cyanide is an alkali metal cyanide.

3. The improved process defined in claim 1 wherein the cyanide is calcium cyanide.

4. In the process of manufacturing sulfur dyestuffs of the sulfurized 2,4-dinitro-4'-hydroxydiphenylamine class by reacting 2,4-dinitro-4'-hydroxydiphenylamine with an alkali metal polysulfide, the improvement which comprises mixing a cyanide of an alkali-forming metal with a slurry of the resulting dyestuff in an aqueous medium having a pH of at least 10, and reacting the resulting mixture with an oxidizing agent, whereby dyestuffs dyeing cotton brighter shades of blue than the untreated dyestuff are produced.

5. The improved process defined in claim 4 wherein the cyanide is mixed with a slurry of the dyestuff in an aqueous sodium hydroxide medium and the resulting mixture is aerated.

6. The improved process defined in claim 4 wherein the aqueous medium also contains a reducing agent which reduces the sulfurized 2,4 - dinitro - 4' - hydroxydiphenylamine.

7. The improved process defined in claim 6 wherein the cyanide treatment is carried out with an amount of the cyanide greater than 50% of the weight of the 2,4-dinitro - 4' - hydroxydiphenylamine sulfurized and at a temperature above 70° C. to produce a substantial proportion of the sulfurized dyestuff in the form of a leuco dyeing compound.

8. The process of manufacturing a sulfur dyestuff of the sulfurized 2,4 - dinitro - 4' - hydroxydiphenylamine class which comprises mixing an alkali metal cyanide with a strongly alkaline aqueous slurry of a dyestuff of the sulfurized 2,4 - dinitro - 4' - hydroxydiphenylamine class, treating the resulting mixture with an oxidizing agent, and recovering the sulfurized dyestuff from the resulting reaction mass, whereby a dyestuff is obtained which gives blue dyeings on cotton from a sodium sulfide dyebath which are brighter than the dyeings obtained with the uncyanided dyestuff.

9. The process of manufacturing a sulfur dyestuff which comprises mixing sodium cyanide with a strongly alkaline aqueous sodium hydroxide slurry of a sulfurized dyestuff which has been obtained by heating 2,4 - dinitro-4' - hydroxydiphenylamine with aqueous sodium polysulfide followed by aeration of the resulting mixture and separation of the sulfurized dyestuff therefrom, oxidizing the mixture thus produced, and salting out the resulting dyestuff, whereby a dyestuff is obtained which gives blue dyeings on cotton from a sodium sulfide dyebath which are brighter than the dyeings obtained with the uncyanided dyestuff.

10. The process of manufacturing a sulfur dyestuff of the sulfurized 2,4 - dinitro - 4' - hydroxydiphenylamine class which comprises mixing an alkali metal cyanide and an alkali metal hydrosulfite with a strongly alkaline aqueous mixture of a dyestuff of the sulfurized 2,4 - dinitro-4' - hydroxydiphenylamine class, treating the resulting mixture with an oxidizing agent, and recovering the sulfurized dyestuff from the resulting reaction mass, whereby a dyestuff is obtained which gives blue dyeings on cotton from a sodium sulfide dyebath which are brighter than the dyeings obtained with the uncyanided dyestuff.

11. The process of manufacturing a sulfur dyestuff which comprises mixing sodium cyanide and sodium hydrosulfite with a strongly alkaline aqueous sodium hydroxide slurry of a sulfurized dyestuff which has been obtained by heating 2,4 - dinitro - 4' - hydroxydiphenylamine with an aqueous sodium polysulfide followed by aeration of the resulting mixture and separation of the sulfurized dyestuff therefrom, aerating the mixture thus produced, and salting out the resulting dyestuff, whereby a dyestuff is obtained which gives blue dyeings on cotton from an aqueous sodium sulfide dyebath which are brighter than the dyeings obtained with the uncyanided dyestuff.

12. The process of manufacturing a sulfur dyestuff defined in claim 11, wherein the cyanide treatment is carried out with an amount of the cyanide greater than 50% of the weight of the 2,4 - dinitro - 4' - hydroxydiphenylamine sulfurized and at a temperature above 70° C. to produce a substantial proportion of the sulfurized dyestuff in the form of a leuco dyeing compound.

References Cited in the file of this patent

UNITED STATES PATENTS

| Re. 11,973 | Abel | Mar. 4, 1902 |
| 1,867,202 | Barnhart | July 12, 1932 |